United States Patent [19]

Hummel et al.

[11] 4,338,771
[45] Jul. 13, 1982

[54] CLAMPING SYSTEM FOR A KNIFE HAVING AN ANGULAR CROSS-SECTION

[75] Inventors: Wolfgang Hummel; Gerhard Koch, both of Schmalkalden; Siegfried Wilhelm, Springstille; Horst Zorn, Schmalkalden, all of German Democratic Rep.

[73] Assignee: VEB Werkzeugkombinat Schmalkalden, Schmalkalden, German Democratic Rep.

[21] Appl. No.: 202,959

[22] Filed: Nov. 3, 1980

[30] Foreign Application Priority Data

Dec. 20, 1979 [DD] German Democratic Rep. ... 217924

[51] Int. Cl.³ .................. A01D 55/00; A01D 1/08
[52] U.S. Cl. .................. 56/294; 30/329; 56/295
[58] Field of Search .......... 30/349, 329, 332, 336, 30/337, 338, 169, 171, 52, 357, 356; 56/294, 295

[56] References Cited

U.S. PATENT DOCUMENTS

| | | | |
|---|---|---|---|
| 403,625 | 5/1889 | Thompson | 30/169 |
| 643,007 | 2/1900 | Richter | 30/169 |
| 1,242,913 | 10/1917 | Blakeslee et al. | 30/336 |
| 1,644,889 | 10/1927 | Murphy et al. | 56/294 |
| 2,238,957 | 4/1941 | Warner | 30/171 |
| 2,539,574 | 1/1951 | Fulmer | 30/338 |
| 2,818,642 | 1/1958 | Judd, Jr. | 30/169 |
| 2,846,764 | 8/1956 | Hyneman | 30/336 |
| 2,876,537 | 3/1959 | Bates | 30/171 |
| 3,049,946 | 8/1962 | Lins | 30/169 |
| 3,331,561 | 7/1967 | Morkowski | 241/192 |
| 3,656,286 | 4/1972 | Glunk et al. | 56/295 |
| 3,660,895 | 8/1972 | West | 30/332 |

*Primary Examiner*—Paul J. Hirsch
*Attorney, Agent, or Firm*—Jordan and Hamburg

[57] ABSTRACT

The invention is directed to a clamping system for knives with angular cross-sections, especially suited for agricultural cutting operations in which a portion of the length of the sidepiece extending the cutting edge of the knife protrudes over the knife holder when the knife is clamped, with the clamping element engaging the knife in the area of its angular bend. This system allows for a reduction of knife thicknesses while maintaining other desirable characteristics, and provides the knife with greater strength in the area stressed by bending as compared with the unclamped position of the knife.

3 Claims, 3 Drawing Figures

CLAMPING SYSTEM FOR A KNIFE HAVING AN ANGULAR CROSS-SECTION

BACKGROUND OF THE INVENTION

The invention relates to a clamping system for knives with an angular cross section, particularly for cutting mechanisms in agricultrual machines such as field harvesters, where the knife is retained by a knife holder and is fastened by a clamping element.

Clamping systems for knives with angular cross sections are previously known for cutting mechanisms in agricultural machines, as described in the USSR-standard GOST No. 441-71 and in U.S. Pat. Nos. 3,635,271; 3,797,766; RE 26,871 and 3,331,561.

In the known clamping systems, the knife which is furnished with an angular cross section, is fastened to the knife holder in such a manner that the whole length of the side-piece extending the cutting edge protrudes over the knife holder including the angular or arcuate area of transition. The known clamping systems for knives with angular cross sections make it possible to improve the geometry of the cutting edges of cutting mechanisms of this kind, involving only small construction and technological efforts.

A disadvantage of the known clamping systems for knives with angular cross sections is that the bending forces pressuring the knife may not surpass the material strength of the knife in its unclamped state. This means that the known clamping systems for knives with angular cross sections, particularly those for cutting systems in agricultural machines, do not serve the need for technological and economical constuctions which conserve material and which are low in cost.

The object of the invention is the creation of a clamping system for knives with angular cross sections, particularly for cutting mechanisms in agricultural machines, which provides greater strength in the area stressed by bending. It is intended that this strength is greater than the strength in the unstressed state.

SUMMARY OF THE INVENTION

This object according to the invention is attained by having a portion of the length of the side-piece extending the cutting edge of the preferably thin knife, protrude over the knife holder while clamped.

According to an additional feature of the invention, the clamping element fastening the knife to the knife holder, is a leaf spring abutting only the rim areas of the knife. This is advantageous in many aspects for the respective mounting or clamping of such machine knives. Futhermore, according to the invention the arrangement of the clamping element is disposed in such a manner, that the clamping element engages the preferably arcuate transition area of the angular cross section of the knife.

According to an additional feature of the invention, the clamping element functions in such a manner that the knife completely abuts the knife holder when clamped. This embodiment of the clamping element, as well as its arrangement and functioning position towards the angular knife, increase the stability of the cutting edge in addition to the elastic clamping action in the area of the support edge of the knife. This increase occurs since the tension produced in the angular cross section of the knife by the clamping forces increases as the angle approaches a straight angle or as the knife is completely adjusted into the respective extended position.

The tension acting upon the knife while clamped provides the knife with greater strength in the area stressed by bending as compared with the strength in the unclamped state. Thus the opportunity has been created to prepare knives with relatively thin cross sections and to obtain greater stability of knives while maintaining the other characteristics. It is also possible to fulfill the need for a reduction of centrifugal forces acting up on such cutting devices, particularly rotating field harvesters.

Additional characteristics, advantages and details of the present invention will result from the following description of an embodiment and with the aid of the following drawings too:

DETAILED DESCRIPTION OF A PEFERRED EMBODIMENT

Figure 1:
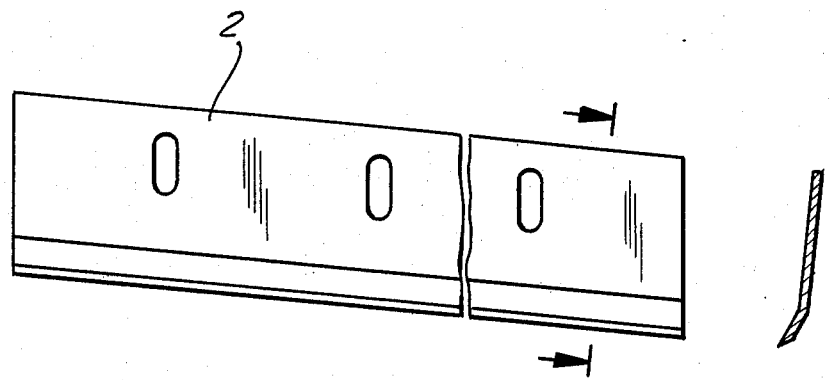
FIG. 1 is a top view of a knife with an angular cross section and a lateral cross section thereof along the line X—X.
Figure 2:
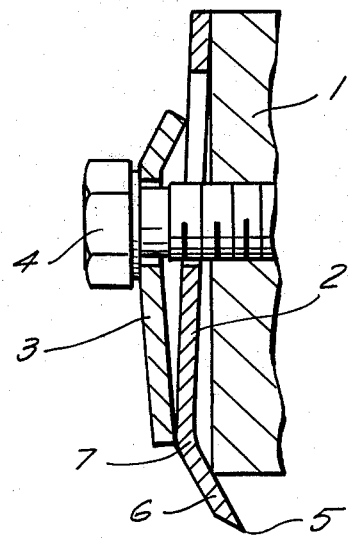
FIG. 2 is the clamping system for knives according to FIG. 1 mounted upon the knife holder and FIG. 3 is the clamping system for knives according to FIG. 1 in tensioned state.

The clamping system principally consists of a knife holder 1, the knife 2, provided with an angular cross section, and a clamping element consisting of a leaf spring 3 together with straining screw 4. The knife 2, provided with an angular cross section, is preferably thin and is mounted in such a manner upon the knife holder 1, that when the side-piece 6 extending the cutting edge 5 is tensioned, a portion of its length protrudes over the knife holder 1, as illustrated on FIGS. 2 and 3.

The clamping element, preferably in the form of a leaf spring 3, with its frontal rim area facing the knife edge 5, presses against the preferably arcuate transition point 7 of the angular cross section of the knife 2 and thereby sets the knife in clamped position against the knife holder 1. Under pressure from the clamping forces, generated by straining screw 4 and exerting pressure through the leaf spring 3 upon knife 2, tension is produced within the angular cross section of the knife which increases as the angle approaches a straight angle or as the knife is completely extended, respectively.

Figure 3:
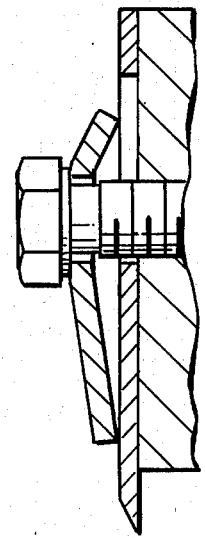

The extended position of knife 2, i.e., the position where the knife completely abuts the knife holder 1 in a clamped position, is illustrated in FIG. 3.

This tension acting upon the knife 2 in the clamped position provides much greater strength in the knife than in the unextended position. This increase is noticeable in the area of the knife where the bending strength is stressed due to the extant cuttng forces. It is possible to thereby considerably reduce previously-needed knife thicknesses for such knives without an increase in the costs of production while maintaining the other operable properties of such knives, such as stability, in particular. The requirement for a method of manufacture benefited by conserving material and expenses, is considerably fulfilled by the clamping system of the invention.

Furthermore, the invention design guarantees secure fastening of the knives and prevents obstruction of the support edges of the knives from jamming in the area of the knife holder.

Finally, is also very advantageous in that the reduction of the thickness of the knives causes a reduction of the mass of the cutting mechanism, which has a beneficial effect upon the wearing properties of these frequently-operated cutting assemblies.

We claim:

1. A clamping system for a knife with an angular cross-section comprising, a transition zone on said knife, said transition zone extending parallel to a cutting edge of said knife to thereby form a bent cutting edge section relative to the remaining knife portion, a knife holder for holding said knife thereon, said knife holder having an edge portion located between the cutting edge and the transition zone of the knife, and a clamping element attached to said knife holder so that when said clamping element is fastened, the transition zone of the knife is straightened and firmly held in the knife holder.

2. A clamping system according to claim 1, in which said clamping element comprises a leaf spring and a screw connected to said knife holder, said leaf spring overlying at least said transition zone of said knife, whereby when the screw is tightened, said transition zone is pushed by said leaf spring and thereby straightened to effect abutment of the knife against the knife holder.

3. A clamping system according to claim 2, in which said leaf spring of said clamping element protrudes at a middle portion thereof away from the knife holder.

* * * * *